Dec. 29, 1953
J. F. G. PETIT
2,664,539
DYNAMOELECTRIC MACHINE
Filed March 31, 1949
2 Sheets-Sheet 1
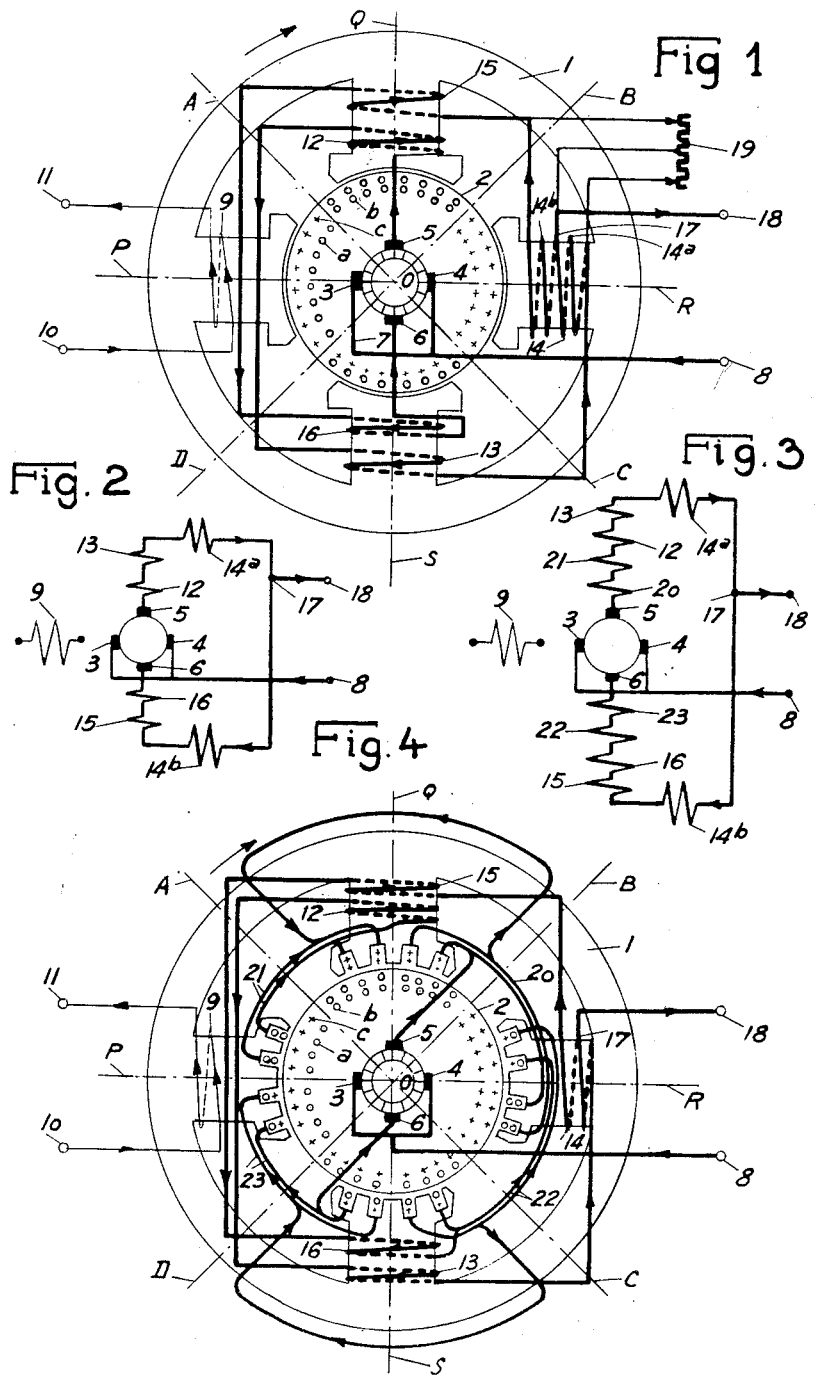
INVENTOR:
JEAN FRANCOIS GABRIEL PETIT
By: Hazeltine, Lake & Co.
AGENTS Dec. 29, 1953          J. F. G. PETIT                2,664,539
                   DYNAMOELECTRIC MACHINE
Filed March 31, 1949                         2 Sheets-Sheet 2
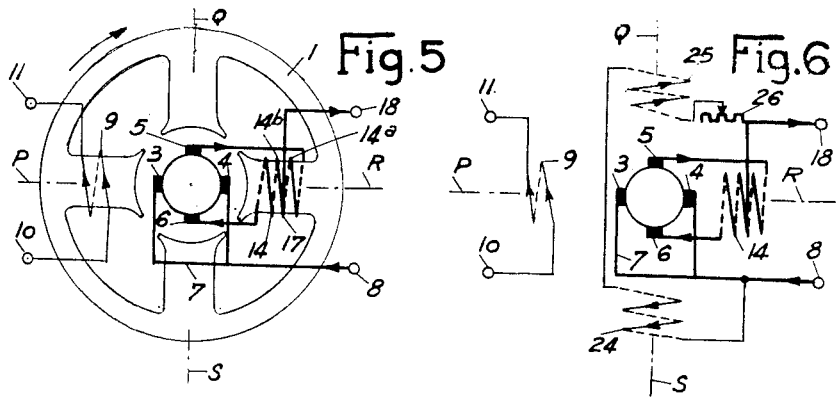
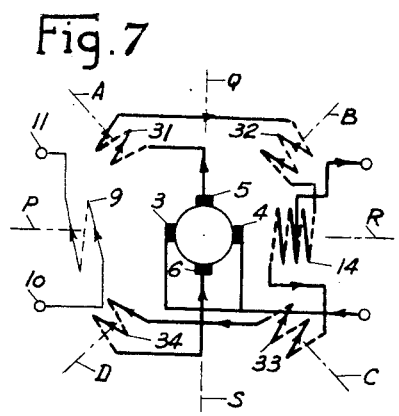
INVENTOR:
JEAN FRANCOIS GABRIEL PETIT
By: Hazeltine, Lake & Co.
AGENTS Patented Dec. 29, 1953

2,664,539

UNITED STATES PATENT OFFICE 2,664,539

DYNAMOELECTRIC MACHINE

Jean François Gabriel Petit, Paris, France, assignor to Societe d'Exploitation de Brevets, Boulogne-sur-Seine, France, a corporation of France Application March 31, 1949, Serial No. 84,523

Claims priority, application France April 6, 1948

6 Claims. (Cl. 322—65)

My invention relates to dynamoelectric machines used as multistage amplifiers, and has for its main object to provide a simplified and improved excitations system for such machines.

Further objects and advantages of my invention will become apparent from the following description, referring to the annexed drawing given by way of example and in which:

Fig. 1 is a schematic diagram of a four-pole machine according to the invention;

Fig. 2 is the circuit diagram thereof;

Fig. 3 shows the same machine with an improved arrangement of pole face compensating windings;

Fig. 4 is the circuit diagram thereof;

Fig. 5 shows a simplified form of the machine;

Fig. 6 shows the same machine equipped for self-excitation;

Fig. 7 shows the machine provided with commutation windings.

For illustrative purposes the machine herein represented is of the four-pole type. It should be noted, however, that the invention is equally applicable to machines having a number of poles which is different and, in particular, multiple of four.

As shown in the drawing the machine comprises a magnetic field structure 1 having four main poles denoted by their axes P, Q, R, S, and an armature 2 having a commutator connected to a conventional D. C. armature winding which is assumed to be of the four-pole multiple type.

The distribution of the elemental currents in the peripheral conductors of the armature winding will be materialized by an equal number of layers of circles (O) and crosses (+), which respectively denote currents flowing out of and into the figure.

The armature commutator is provided with a set of primary brushes 3, 4 and a set of secondary brushes 5, 6 displaced substantially 180 electrical degrees from primary brushes for providing a primary circuit and a secondary circuit respectively through the armature winding.

The primary brushes 3, 4 are short-circuited through a connection 7 which in turn is connected to a load terminal 8. Energization of the primary circuit is obtained by means of an input control field winding 9 arranged on the field structure to provide a component of control field excitation in order to induce a voltage across the primary brushes 3, 4.

The armature being assumed to run clockwise, if control winding 9 is energized by means of a small current flowing for example from terminal 10 to terminal 11 of said control winding, a component of control flux will be set up in the direction from R toward P.

A voltage $E_1$ is thereby generated across the primary circuit such that a relatively large current $I_1$ is caused to flow in the connection 7 for example from brush 3 to brush 4. The primary current $I_1$, whose distribution in the armature winding is given by the inner layer $a$, produces a primary armature reaction flux which extends at right angle to the control flux namely from S toward Q and therefore induces a voltage $E_2$ in the secondary circuit of the armature winding.

The secondary circuit of the armature winding is completed through an internal circuit including a so-called field compensating-exciting winding adapted to produce a component of magnetic excitation which will be utilized in conjunction with the secondary armature reaction flux to provide for a four-pole magnetization of the field structure.

As shown in Figs. 1 and 2 the internal circuit comprises, serially connected between brushes 5 and 6, two field exciting coils 12 and 13 on poles Q and S respectively, a field compensating-exciting coil 14 on pole R and two field exciting coils 15 and 16 on poles Q and S respectively. The field compensating-exciting coil 14 has an intermediate tap 17 which is connected to another load terminal 18. The intermediate tap 17 thus divides coil 14 into two sections 14a and 14b.

The secondary voltage $E_2$ causes a secondary current $I_2$ to flow from brush 5 to brush 6, as shown by the arrows, on the conductors of the internal circuit. The secondary current $I_2$, whose distribution in the armature winding is given by the intermediate layer $b$, produces a secondary armature reaction flux which extends at right angle to the primary armature reaction flux namely from P toward R, i. e. in opposition to the control flux. The field compensating-exciting coil 14 is arranged to provide under excitation by the secondary current a flux opposing the secondary armature reaction flux.

If N denotes the number of peripheral conductors of the armature winding and $n$ and $n'$ the numbers of turns of sections 14a and 14b respectively, it is seen that, by so dimensioning coil 14 that ampere-turns $(n+n')I_2$ exactly oppose the secondary armature reaction magnetomotive force $$\frac{N}{8}I_2$$

there is obtained along the axis PR a magnetic balance between the secondary armature reaction M. M. F. and the M. M. F. from coil 14, which results in the production of a four-pole magnetisation of the field structure. As a matter of fact, each of both secondary armature winding paths on the opposite sides of axis QS produces one half of the total secondary armature reaction M. M. F.; the M. M. F. due to the left-hand side secondary path produces a first magnetic excitation component in the direction from P toward O; the M. M. F. due to the right-hand side secondary path is neutralized by one half of the ampere-turns from coil 14, while the other half of the latter produces a second magnetic excitation component in the direction from R toward O.

Both these components act together to build up a consequent-pole four-pole magnetisation of the field structure, whereby an output voltage $E_3$ appears across the primary brushes 3, 4 on the one hand and the secondary brushes 5, 6 on the other hand, and then across load terminals 8 and 18.

Field-exciting coils 12, 13, 15 and 16 are properly rated and arranged on poles Q and S so as to assist the consequent-pole magnetisation without affecting the primary armature reaction flux along axis QS. It will be noted, however, that an over- or undercompounding effect by current $I_2$ along axis QS may be obtained if desired by properly adjusting the numbers of turns of these coils.

It will be noted that potentials of the four brushes are not equal, due to current unbalance. With the example shown the primary brushes are negative but slightly different in potential, while the secondary brushes are positive but markedly different in potential, since current $I_2$ is larger than current $I_1$.

As a result, potential of brush 6 is nearer to the mean potential of primary brushes 3, 4 than brush 5. If control voltage polarity is reversed at input terminals 10, 11, the direction of rotation being kept the same, the mean polarity of brushes 3, 4 and 5, 6 is reversed, but potential of brush 6, now negative, remains nearer to the mean potential of brushes 3, 4 now positive, than brush 5.

If a load (not shown) is connected across terminals 8, 18, the output voltage $E_3$ will cause a load current $I_3$ to flow in the direction shown by the arrows on the output circuit leads. The distribution of load current $I_3$ in the armature winding is given by the outer layer c. As regards loading of the secondary circuit, there is a current $$I_2 + \frac{I_3}{2}$$

between brush 5 and tap 17 and a current $$I_2 - \frac{I_3}{2}$$

between tap 17 and brush 6. Therefore the value of the total ampere-turns produced in the field compensating-exciting coil 14 is $$(n+n')I_2 + (n-n')\frac{I_3}{2}$$

If $n$ and $n'$ are equal, the ampere-turns due to load current $I_3$ cancel each other and if $n$ and $n'$ are different, there is an over- or undercompounding effect by load current $I_3$ along axis PR. Such an effect may be obtained by using several taps on coil 14 or shunting one or both sections thereof by means of a variable resistor as indicated in 19 in Fig. 1.

On the same manner there is a cancellation of the ampere-turns due to load current $I_3$ in field coils 12, 13, 15 and 16 if they have equal numbers of turns, and an over- or undercompounding effect along axis QS, if they have different numbers of turns.

The machine described so far operates as three cascade connected elemental generators, viz. a first two-pole generator using the input control circuit as its field exciting means and the short-circuit connection of the primary brushes as its output circuit, a second two-pole generator using the primary armature circuit as its field exciting means and the circuit connection of the secondary brushes as its output circuit, and a main four-pole generator using both the secondary armature circuit and the secondary brushes circuit connection as its field exciting means and using both output circuits of the first and second generators as its output circuit, these generators being the first, second and third stage of a three-stage amplifier.

The load current $I_3$, upon flowing in the armature winding, produces a distortion of the main four-pole magnetization which may have a detrimental effect particularly in the motor operation of the machine. This effect may be reduced or prevented by using field compensating windings as shown in Figs. 3 and 4 in 20, 21, 22 and 23. Each of these windings for example comprises two coils of the pole face type arranged in slots of the pole tips. Windings 21 and 23 are normally wound between adjacent tips of poles P, Q and P, S. Instead of being disposed symmetrically with respect to axis Q, S, windings 20 and 22 are arranged so as to overlap each other on pole R, as shown in Fig. 4. Windings 20, 21 are serially connected in the circuit arm between brush 5 and the field compensating-exciting coil 14, while windings 22, 23 are serially connected in the circuit arm between the latter and brush 6, as shown in Fig. 3.

Assuming these windings are traversed by a current coming out at brush 5 and entering at brush 6, winding 20 produces a flux from B toward O, winding 21 a flux from O toward A, winding 22 a flux from C toward O and winding 23 a flux from O toward D.

The distribution of elemental currents $I_2$ and $I_3$ in the conductors of the compensating windings is materialized by a slot bottom layer of circles and crosses for current $I_2$ and by a slot top layer for current $I_3$.

In the angle POA the compensating M. M. F. due to current $$\left(I_2 + \frac{I_3}{2}\right)$$

balances the armature M. M. F. due to current $$\left(I_2 + \frac{I_3}{2}\right)$$

In the angle DOC the compensating M. M. F. due to current $$\left(I_2 - \frac{I_3}{2}\right)$$

balances the armature M. M. F. due to current $$\left(I_2 - \frac{I_3}{2}\right)$$

In the angle AOD the compensating M. M. F. due to current $I_3$ balances the armature M. M. F. due to current $I_3$, while the compensating M. M. F. due to current $I_2$ slightly assists the four-pole magnetisation by producing a small flux from P toward O.

In the angle BOC the compensating M. M. F. due to current $I_3$ balances the armature M. M. F. due to current $I_3$, while the compensating M. M. F. due to current $I_2$ markedly assists the four-pole magnetization by producing a flux from R toward O due to overlapping of windings 20 and 23.

This permits of greatly reducing the turns of coil 14 or even dispensing with this coil.

The field coils 12, 13, 15 and 16 which are adapted to assist the four-pole magnetization build up by the secondary armature circuit and the field compensating-exciting coil 14 are only provided for to increase the amplification degree of the machine, and therefore may be dispensed with for the purpose of simplification of the machine. A simplified design thereof is illustrated in Fig. 5 wherein secondary brushes 5 and 6 are directly connected to the ends of field compensating-exciting coil 14, with poles Q and S being unwound. In this embodiment only the secondary circuit of the armature winding and coil 14 ensure the consequent pole four-pole magnetization.

Instead of using field coils such as 12, 13, 15 and 16 to assist the four-pole magnetization with current $I_2$ it is possible to obtain the same result by using field exciting windings energized by the output voltage $E_3$ of the third stage. Such an arrangement is illustrated in Fig. 6. For purpose of convenience the magnetic structure has been omitted in Fig. 6 as well as in the following others, and the pole pieces will then be denoted by their axes. The machine is equipped with ordinary shunt field coils which may be wound on poles Q and S only as indicated in 24 and 25. These coils have been shown series-connected across load terminals 8, 18. Preferably a tuning resistor 26 is provided to adjust the field resistance in such a manner that the excitation line never cut the magnetization curve; this permits of considerably increasing the amplification degree of the machine since the major part of the total ampere-turns are supplied by these coils. The latter may have equal numbers of turns. However, it is advantageous to give one of them, namely coil 24 in the case of clockwise rotation, slightly more turns than the other in order that the voltage $E_3$ due to residual magnetism along axis QS produces a magnetomotive force which opposes this residual magnetism.

In order to improve commutation ordinary interpoles may be added to the field structure of the machine. In practice it is necessary to build a commutation E. M. F. only in the commutating armature conductors of the second and third stages, since the secondary and load currents are fairly higher than the primary current. As shown in Fig. 7, four commutation coils 31, 32, 33 and 34 are disposed on four interpoles A, B, C and D, respectively. Coils 31 and 32 are serially connected in the half circuit connection from brush 5 to coil 14 so as to be traversed by a current $$I_2 + \frac{I_3}{2}$$

while coils 33 and 34 are connected in the half circuit connection from coil 14 to brush 6 so as to be traversed by a current $$I_2 - \frac{I_3}{2}$$

The four coils are arranged to produce under excitation by the component of secondary current $I_2$ a two-pole magnetization from R toward P, i. e. in opposition to the secondary armature reaction flux and, under excitation by the component of load current $I_3$, a four-pole magnetisation along axes AC and BD in opposition to the armature reaction flux due to load current. Both these magnetizations assist the commutation of the second and third stages respectively.

It is to be understood that the invention is not limited to the particular arrangements disclosed which have been given for purposes of illustration only, and that modifications may be made without departing from the spirit of the invention. Thus, control flux may be caused to act along axis QS instead of axis PR, but only two stages of amplification are now available.

What I claim is:

1. In a rotary direct-current machine having a field structure with a plurality of poles of alternate polarities and an armature with a plurality of brushes of alternate polarities, the combination of means for generating a circulating current between brushes of one polarity, whereby the armature is caused to produce a circulating current responsive armature reaction along the axis of two poles of the same polarity, and of a compensating-exciting winding energized by said circulating current and arranged on said field structure at one end only of said axis so as to act in the opposite direction to and with substantially the same strength as the said armature reaction.

2. A rotary direct-current machine comprising a field structure with two poles of one polarity and two poles of the other polarity and an armature with two interconnected primary brushes associated with the two former poles and two interconnected secondary brushes associated with the two latter poles, means for generating a secondary circulating current between said secondary brushes whereby the armature is caused to produce a secondary circulating current responsive armature reaction along the axis of the poles of said one polarity, means for producing a four-pole magnetization of said field structure in dependence upon said secondary circulating current, said latter means including a compensating-exciting winding serially connected in the circuit of the secondary brushes so as to be energized by said secondary circulating current and arranged on one pole only of said one polarity so as to produce therein a magnetic excitation of substantially equal strength to that produced in the other pole of one polarity by the secondary armature reaction, and means for connecting a load circuit between the circuits of the primary and secondary brushes, the connection with the latter being made in a point intermediate the ends of said compensating-exciting winding.

3. A rotary direct-current machine as claimed in claim 2, which comprises auxiliary windings symmetrically connected in the circuit of the secondary brushes so as to be energized by said secondary circulating current and arranged on said poles of the other polarity so as to assist said four-pole magnetization.

4. A rotary direct-current machine as claimed in claim 2, which comprises four pole-face compensating windings symmetrically connected in the circuit of the secondary brushes so as to product a compensating field proportional to the load current.

5. A rotary direct-current machine as claimed in claim 4, wherein the compensating windings associated with the pole carrying the compensating-exciting winding overlap each other on this pole so as to act cumulatively with said compensating-exciting winding.

6. A rotary direct-current machine as claimed in claim 2, which comprises four commutation windings symmetrically connected in the circuit of the secondary brushes and arranged on four interpoles so as to produce a commutating field proportional to the secondary circulating current and the load current.

JEAN FRANÇOIS GABRIEL PETIT.

References Cited in the file of this patent

UNITED STATES PATENTS

| Number | Name | Date |
| --- | --- | --- |
| 2,445,788 | Litman | July 27, 1948 |
| 2,484,840 | Liwschitz et al. | Oct. 18, 1949 |